(12) United States Patent
Xie et al.

(10) Patent No.: US 9,116,664 B2
(45) Date of Patent: Aug. 25, 2015

(54) ELECTRONIC PANEL, MANUFACTURING METHOD THEREOF AND ELECTRONIC DEVICE

(75) Inventors: Yanjun Xie, Wuhan (CN); Yau-Chen Jiang, Zhubei (TW); Bixin Guan, Zhangping (CN); Fuping Wang, Sanming (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 0 days.

(21) Appl. No.: 13/491,546

(22) Filed: Jun. 7, 2012

(65) Prior Publication Data

US 2013/0163154 A1 Jun. 27, 2013

(30) Foreign Application Priority Data

Dec. 25, 2011 (CN) .......................... 2011 1 0455709

(51) Int. Cl.
*G02F 1/1333* (2006.01)
*G06F 1/16* (2006.01)

(52) U.S. Cl.
CPC .......... *G06F 1/1626* (2013.01); *G02F 1/13338* (2013.01); *G02F 1/133345* (2013.01)

(58) Field of Classification Search
CPC .................. G02F 1/13338; G02F 1/133345
USPC ...................................................... 349/12, 122
See application file for complete search history.

(56) References Cited

U.S. PATENT DOCUMENTS

| 2009/0284683 A1* | 11/2009 | Usukura et al. ................. 349/62 |
| 2010/0061040 A1* | 3/2010 | Dabov et al. ............. 361/679.01 |
| 2010/0231821 A1* | 9/2010 | Tsuji et al. ...................... 349/58 |

FOREIGN PATENT DOCUMENTS

| JP | 2011007830 A | 1/2011 |
| TW | M381835 U1 | 6/2010 |

* cited by examiner

*Primary Examiner* — Phu Vu
(74) *Attorney, Agent, or Firm* — Gokalp Bayramoglu

(57) ABSTRACT

An embodiment of the present disclosure provides an electronic panel. The electronic panel comprises a protection cover having a visible area and a non-visible area, and a plurality of mask layers sequentially disposed on the non-visible area of the protection cover, wherein at least one of the mask layers has at least an escape ditch. Bubbles produced during the coating process can be discharged from the escape ditch, thereby improving the product's appearance and light transmittance. In addition, the present disclosure further provides a method of manufacturing the electronic panel and an electronic device.

20 Claims, 6 Drawing Sheets

ELECTRONIC PANEL, MANUFACTURING METHOD THEREOF AND ELECTRONIC DEVICE

BACKGROUND OF THE INVENTION

This Application claims the benefit of the People's Republic of China Application No. 201110455709.7, filed on Dec. 25, 2011.

FIELD OF THE INVENTION

The present disclosure relates to an electronic panel. More particularly, the present disclosure relates to an electronic panel comprising a plurality of mask layers on a protection cover, a manufacturing method thereof, and an electronic device.

DESCRIPTION OF THE RELATED ART

With the improvement of touch technologies, a touch panel as an input device is widely used in electronic devices such as smart phones, touch PCs, and tablet PCs.

A conventional touch panel usually has a protection cover, wherein the protection cover has a sensing area and a peripheral area surrounding the sensing area. A mask layer is coated on the peripheral area of the protection cover, wherein the mask layer is used to beautify the appearance or shade non-transparent conductive wires that transmit signals of the sensing area to an external circuit. However, in practical production, due to the mask layer in the peripheral area having a certain thickness, when an adhesive layer is coated on the protection cover in the sensing area and on the mask layer in the peripheral area, bubbles generated at the boundaries between the sensing area and the peripheral area will be blocked at corners of the protection cover and the mask layer, being unable to be discharged and thus affecting appearance and light transmittance of a touch product. The thicker the mask layer is, the harder the bubbles are discharged from the sensing area, and the larger the influence in the product's appearance and light transmittance is.

SUMMARY OF THE INVENTION

The present disclosure provides an electronic panel with at least a mask layer having at least an escape ditch, from which bubbles produced in the electronic panel can be discharged, thereby improving the product's appearance and light transmittance.

An embodiment of the present disclosure provides an electronic panel, which comprises a protection cover having a visible area and a non-visible area, and a plurality of mask layers sequentially disposed on the non-visible area of the protection cover, wherein at least one of the mask layers has at least an escape ditch.

Another embodiment of the present disclosure provides a method of manufacturing an electronic panel. The method comprises the step of sequentially disposing a plurality of mask layers on the protection cover, wherein the protection cover has a visible area and a non-visible area, and the mask layers are formed within the non-visible area, and wherein at least one of the mask layers has at least an escape ditch.

Still another embodiment of the present disclosure provides an electronic device which comprises at least an electronic chip; and an electronic panel electrically connected to the electronic chip, wherein the electronic panel comprises: a protection cover having a visible area and a non-visible area; and a plurality of mask layers sequentially disposed on the non-visible area of the protection cover, wherein at least one of the mask layers has at least an escape ditch.

In order to further understand characteristics and technical aspects of the present disclosure, several descriptions accompanied with drawings are described in detail below. However, descriptions and accompanying drawings are for purposes of reference and specification only, but not for limiting scope of the present disclosure.

DETAILED DESCRIPTION OF THE EMBODIMENTS

Figure 1:
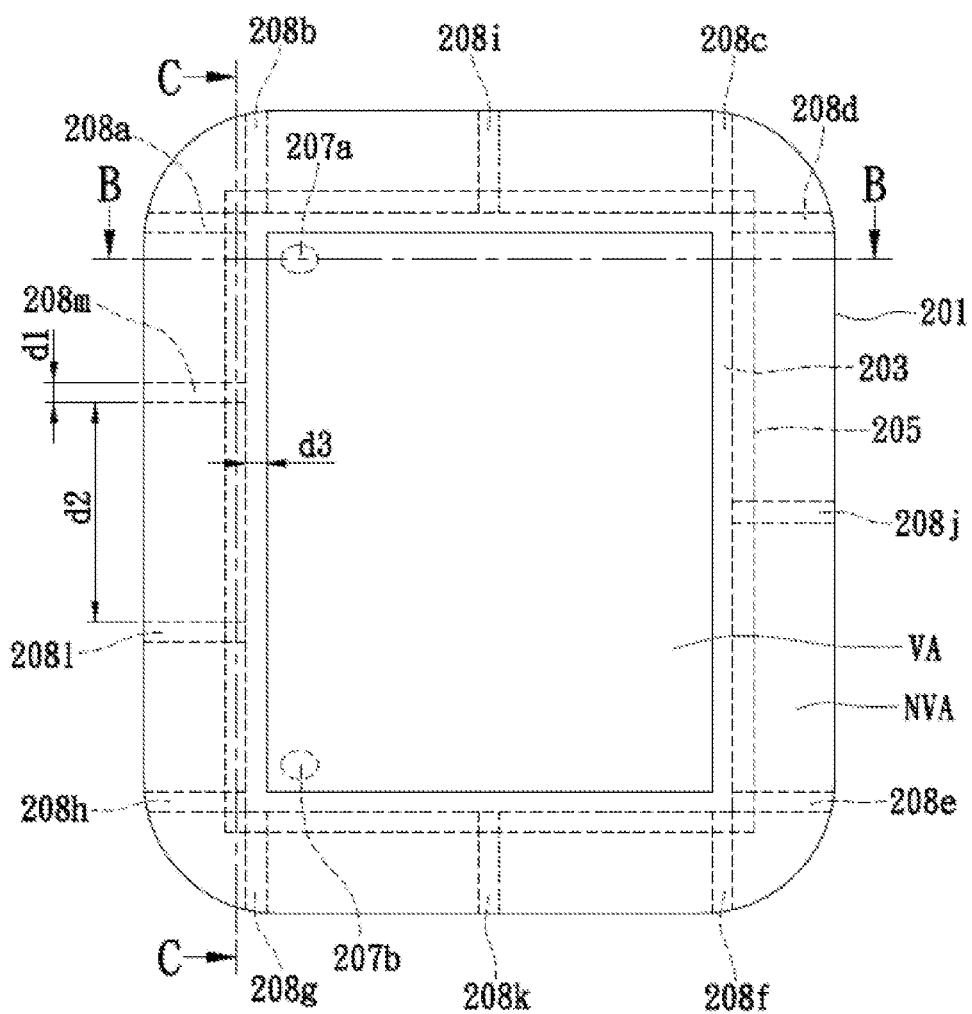
FIG. 1 is a top view diagram of an electronic panel in accordance with an embodiment of the present disclosure.
Figure 2A:
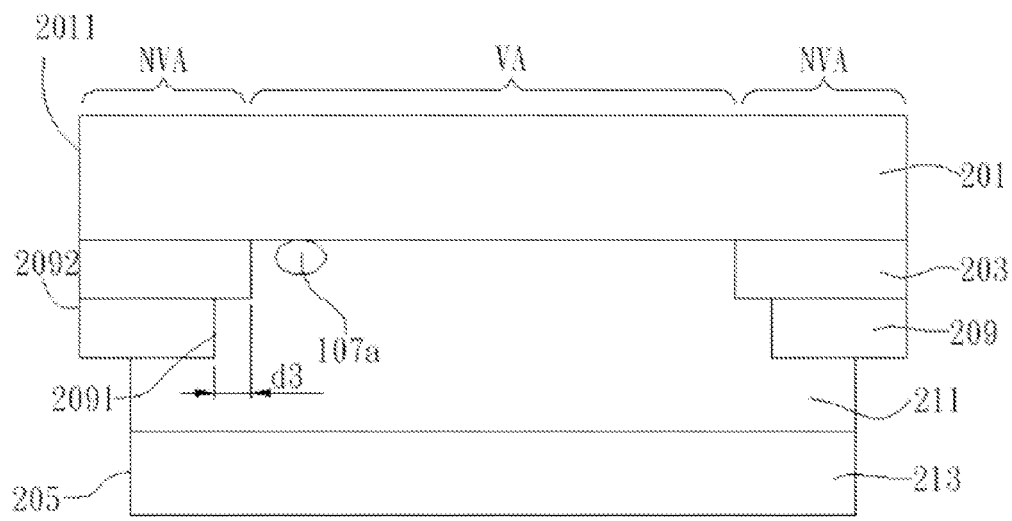
FIG. 2A and FIG. 2B are respectively section view diagrams along section lines BB and CC of an electronic panel as FIG. 1.
Figure 2B:
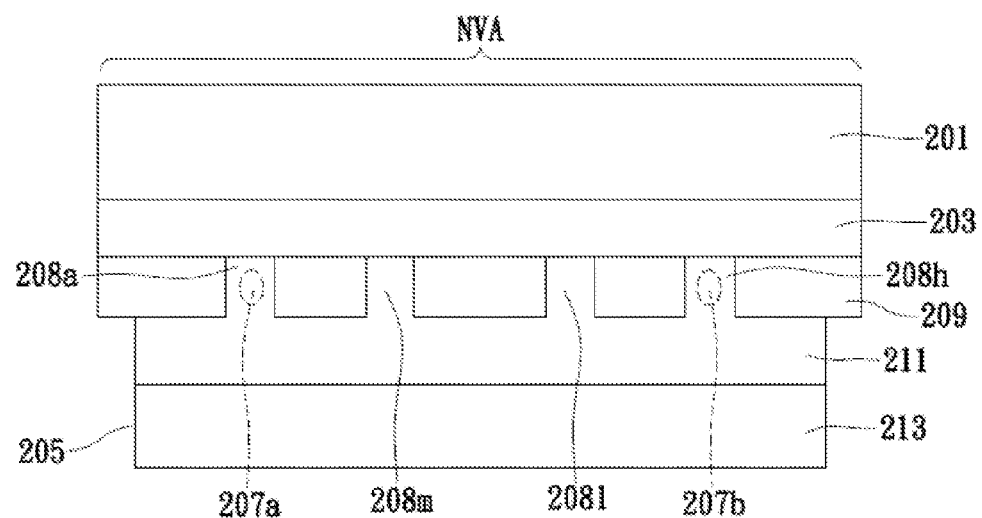

With reference to FIG. 1, FIG. 2A and FIG. 2B, FIG. 1 is a top view diagram of an electronic panel in accordance with an embodiment of the present disclosure, and FIG. 2A and FIG. 2B are respectively section view diagrams along section lines BB and CC of an electronic panel as FIG. 1.

As shown in FIG. 1, the electronic panel 20 can be disposed in an electronic device, and can be disposed on an outer layer of the electronic device or on an inner layer which is adjacent to a shell. The electronic panel 20 comprises a protection cover 201 and a plurality of mask layers (for example, a first mask layer 203, a second mask layer 209) sequentially disposed on the protection cover 201, wherein at least one of the mask layers has at least an escape ditch, such as escape ditch 208a. In this embodiment, the electronic panel 20 is a touch panel which further comprises an adhesive layer 211 and a sensing layer 213. It is to be noted that, in another embodiment, the electronic panel 20 is a display panel which further comprises an adhesive layer 211 and a display module 213. If the sensing layer 213 is removed and the electronic panel is directly laminated to the display module, the electronic panel 20 can be a display panel.

The protection cover 201 is usually a transparent substrate, and can be made of glass or plastic. The protection cover 201 has a visible area VA and a non-visible area NVA. In general, the non-visible area NVA is normally an opaque peripheral area of protection cover 201, while the visible area VA is usually a light transmission non-peripheral area where users can perform an interactive touch operation or read information. The non-visible area NVA usually uses mask layers (for example, the first mask layer 203 and the second mask layer 209) for shading, and the mask layers can be used as peripheral decorating layers for beautifying the electronic panel 20.

A plurality of mask layers are sequentially disposed on the protection cover 201. The first mask layer 203 is disposed on the non-visible area NVA of the protection cover 201, and the second mask layer 209 is disposed on the first mask layer 203. The first mask layer 203 and the second mask layer 209 form a colored frame on the non-visible area NVA of the protection cover 201 for preventing the light penetrating. The colored frame can beautify the appearance of the electronic panel 20, wherein the larger number of the mask layers is, the thicker the colored frame is, and the better shading affect the electronic panel 20 has. The mask layers can be printing ink layers. Moreover, in practical production, for an impact of tolerance factor produced by the manufacturing process, sizes of the mask layers are various. With reference to FIG. 2A, the border of the second mask layer 209 that corresponds to the border of the first mask layer 203 is normally recessed for a specific distance d3, for example, about 0.2 mm.

The adhesive layer 211 can be made of optical clear adhesive, which is formed on the first mask layer 203 and the second mask layer 209 within the non-visible area NVA, and on the protection cover 201 within the visible area VA. The adhesive layer 211 is used for laminating the sensing layer 213 and the protection cover 201 to form a touch panel, or for laminating the display module and the protection cover 201 to form a display panel.

The adhesive layer 211 is usually formed by coating an optical clear adhesive. However, when coating the optical clear adhesive, due to the mask layer in the visible area VA having a certain thickness, bubbles 207a and 207b generated at the boundaries between the visible area VA and the non-visible area NVA during the coating process will be blocked at corners of the visible area VA of the protection cover 201. In order to discharge the bubbles 207a and 207b, the second mask layer 209 is provided with escape ditches 208a and 208h. Accordingly, the bubbles 207a and 207b can be discharged from the visible area VA of the electronic panel 20 through the escape ditches 208a and 208h of the second mask layer 209.

It is to be noted that the number and position of the foregoing escape ditches are not for limiting the present disclosure. For example, besides the escape ditches 208a and 208h disposed in the upper left corner and lower left corner of the second mask layer 209 of the electronic panel 20, the second mask layer 209 can further have escape ditches 208b~208g and 208i~208m located at other positions of the electronic panel 20.

In general, bubbles of a small panel are normally gathered in the corners of the panel, and bubbles of a large panel are distributed over other areas of the panel besides corners because air on the large panel is hard to be pushed to the corners by the adhesive. Therefore, the number, width, and positions of the escape ditches, in accordance with the present disclosure, can be appropriately adjusted according to the different sizes and shapes of the protection cover 201. For example, a small panel is provided with eight escape ditches 208a-208h in the four corners of the second mask layer 209, and a large panel is provided with four additional escape ditches 208i~208l in two adjacent corners of the second mask layer 209 besides having eight escape ditches 208a~208h in the four corners of the second mask layer 209.

Further, distance between two adjacent escape ditches can be 1/20 to 1/10 of the side length of the protection cover 201 and the width of the escape ditch can be 0.1 mm to 0.2 mm. In one embodiment, distance d2 between two adjacent escape ditches (such as escape ditches 208l and 208m) is approximately 5 mm, and the width d1 of the escape ditch (such as escape ditch 208m) is approximately 0.1 mm. It is to be noted that the embodiments of the present disclosure do not limit the number, width, and positions of the escape ditches as well as distance between two adjacent escape ditches.

Moreover, the first mask layer 203 and the second mask layer 209 have a rectangular shape. The second mask layer 209 has an inner edge 2091 and an outer edge 2092, wherein the outer edge 2092 of the second mask layer 209 is adjacent to an edge 2011 of the protection cover 201, and the inner edge 2091 of the second mask layer is adjacent to the visible area VA. The means of the escape ditches 208a~208m going through the inner edge and the outer edge is not limited by the disclosure. For example, the escape ditches 208a~208m can directly go though the inner edge and the outer edge of the mask layer, or the escape ditches 208a~208m can windingly go though the inner edge and the outer edge of the mask layer.

Figure 3A:
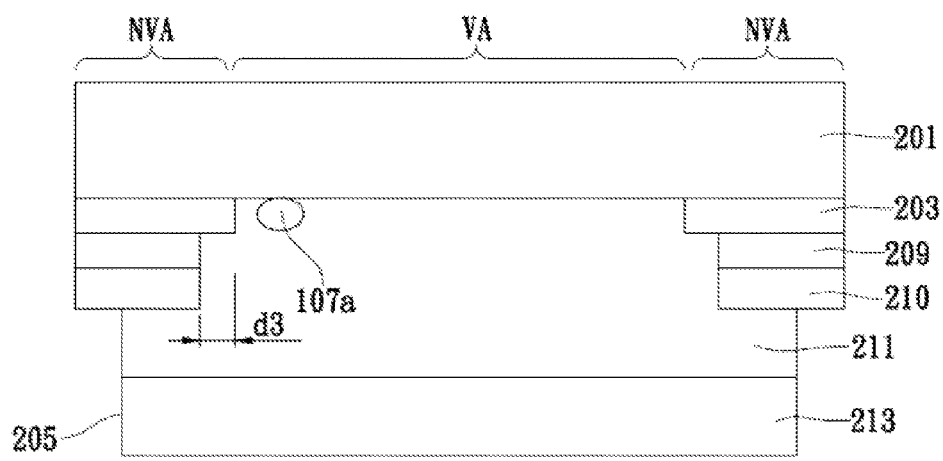
FIG. 3A and FIG. 3B are respectively another section view diagrams along section lines BB and CC of an electronic panel as FIG. 1.
Figure 3B:
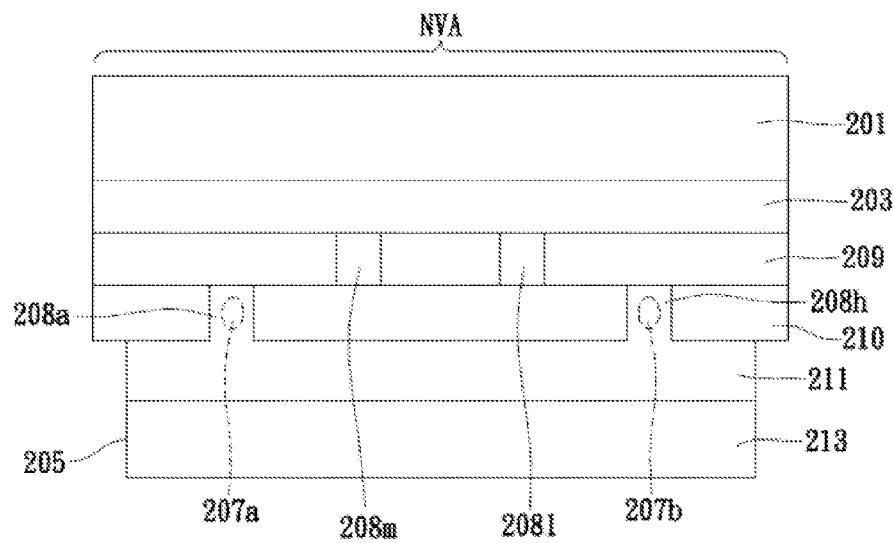

With reference to FIG. 1, FIG. 3A, and FIG. 3B simultaneously, FIG. 3A and FIG. 3B respectively illustrate section view diagrams along section lines BB and CC of an electronic panel as FIG. 1. The embodiments of FIG. 3A and FIG. 3B are different from those of FIG. 2A and FIG. 2B, wherein an electronic panel 20 of FIG. 3A and FIG. 3B has three mask layers including a first mask layer 203, a second mask layer 209 and a third mask layer 210, wherein the second mask layer 209 and the third mask layer 210 have escape ditches 208a~208m. Besides, an adhesive layer 211 is formed on the first mask layer 203, the second mask layer 209 and the third mask layer 210 within the non-visible area NVA, and on the protection cover 201 within the visible area VA.

The second mask layer 209 and the third mask layer 210 both have an inner edge and an outer edge, wherein the inner edge is adjacent to the visible area VA, and the outer edge is adjacent to the edge 2011 of the protection cover 201. The escape ditches 208a~108m go through the inner edge and the outer edge of the mask layers. In this embodiment, the third mask layer 210 has escape ditches 208a and 208h, and the escape ditches 208a and 208h go through the inner edge and the outer edge of the third mask layer 210. In addition, the second mask layer 209 has escape ditches 208l and 208m, and the escape ditches 208l and 208m go through the inner edge 2091 and the outer edge 2092 of the second mask layer 209. In another embodiment, the escape ditches 208a~208m simultaneously go through the second mask layer 209 and the third mask layer 210 (not shown). It is to be noted that the number and positions of the escape ditches of the second mask layer 209 and the third mask layer 210 can be same or different, and not limited by the embodiment of the present disclosure.

It is to be noted that in the above embodiments, the second mask layer 209 to the last mask layer (the third mask layer 210) have escape ditches respectively, but the first mask layer 203 which is the nearest to the protection cover 201 does not have escape ditches, the purpose of which is to get a better appearance of the electronic panel. Although the first mask layer 203 does not have any escape ditch, bubbles on the protection cover 201 can be discharged from the escape ditches 208a~208m of the second mask layer 209 or the third mask layer 210, because the first mask layer 203 is thin enough for the bubbles being squeezed out of the visible area VA. It is noted that the protection cover 201 has a plurality of mask layers; thus, any one of the mask layers can be made much thinner, compared with the protection cover 201 having only one mask layer. Usually, the larger the number of mask layers is, the thinner the mask layer is.

Figure 4:
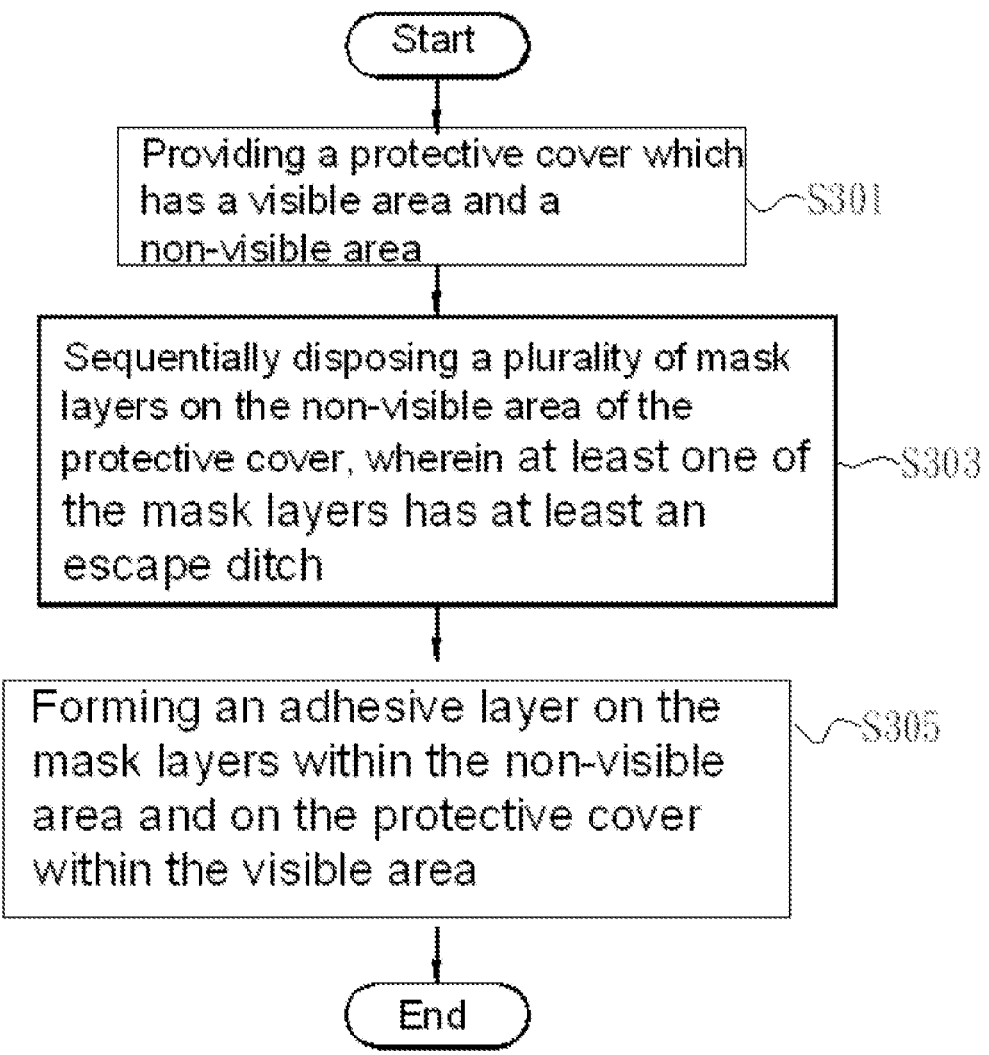
FIG. 4 is a flow chart diagram of manufacturing an electronic panel in accordance with another embodiment of the present disclosure.

With reference to FIG. 4, FIG. 4 is a flow chart diagram of manufacturing an electronic panel in accordance with another embodiment of the present disclosure. The electronic panel can be a touch panel or a display panel. Firstly, in step S301, a protection cover which has a visible area and a non-visible area is provided. Then, in step S303, a plurality of mask layers are sequentially disposed within the non-visible area of the protection cover, wherein at least one of the mask layers has at least an escape ditch going through the inner edge and the outer edge of the corresponding mask layer. The mask layers having escape ditches can be formed by printing. After that, in step S305, an adhesive layer is formed on the protection cover within the visible area VA and on the mask layers within the non-visible area NVA for laminating a sensing layer to form a touch panel, or alternatively, laminating a display module to form a display panel.

Figure 5A:
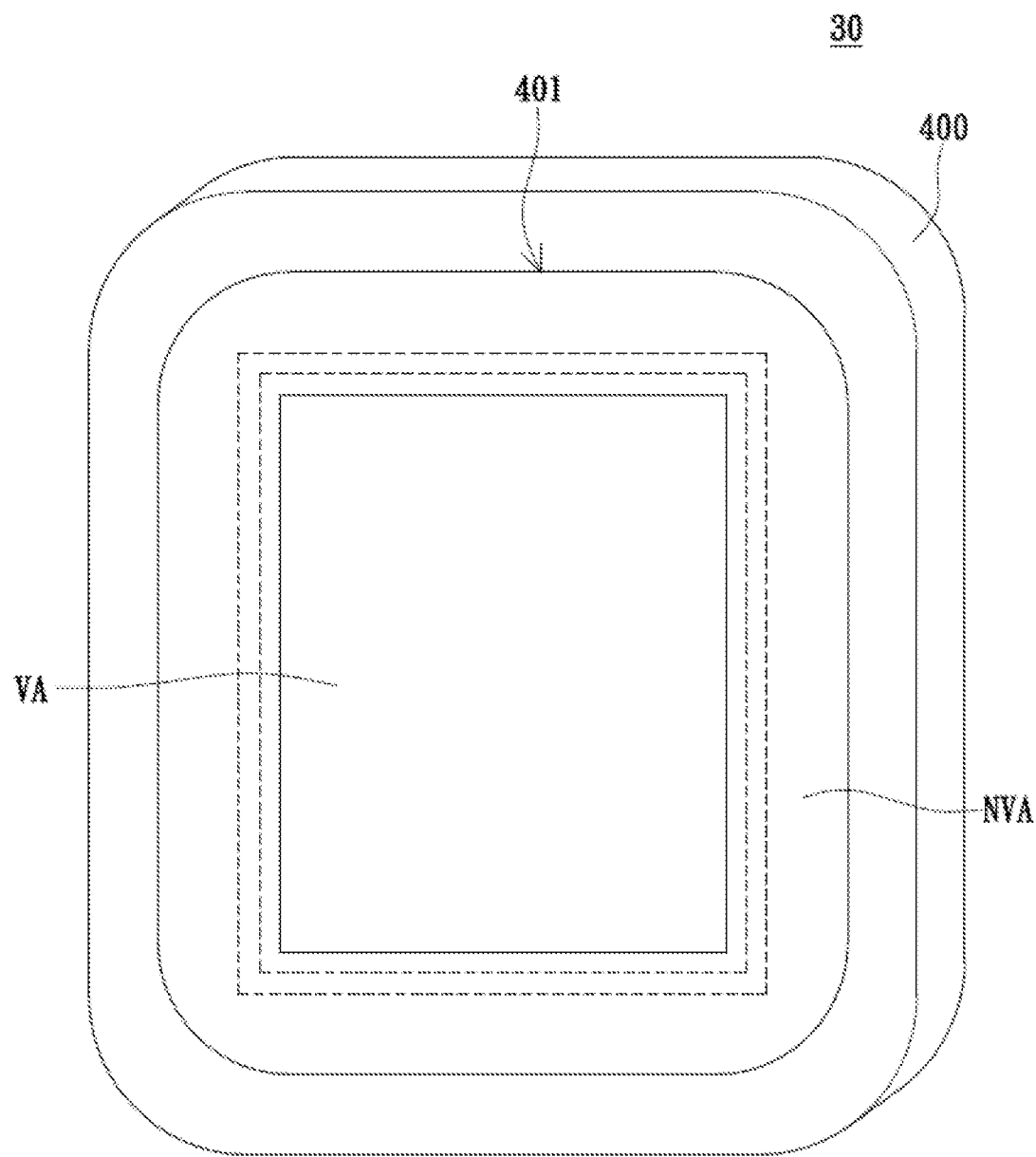
FIG. 5A is a three dimensional diagram of an electronic device in accordance with another embodiment of the present disclosure.
Figure 5B:
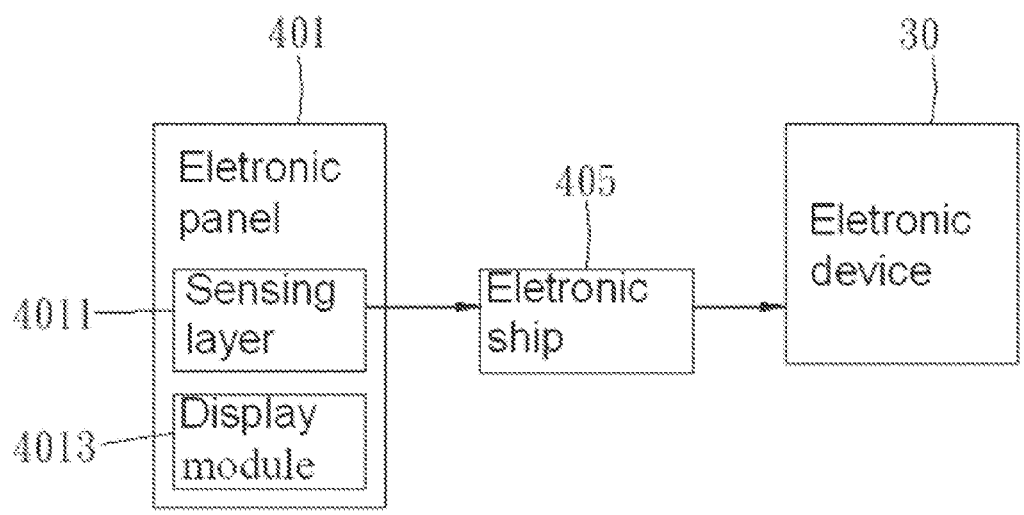
FIG. 5B is a block diagram of an electronic device in accordance with another embodiment of the present disclosure.

With reference to FIG. 5A and FIG. 5B simultaneously, FIG. 5A and FIG. 5B are a three dimensional diagram and a block diagram of an electronic device in accordance with another embodiment of the present disclosure. An electronic device 30 comprises a shell 400, an electronic chip 405, and an electronic panel 401. The electronic panel 401 comprises a protection cover having a visible area VA and a non-visible area NVA, and a plurality of mask layers sequentially disposed on the non-visible area of the protection cover, wherein at least one of the mask layers has at least an escape ditch. Features of the escape ditch have been described in the above embodiments, so description would not be made again herein. The electronic panel 401 is adjacent to the shell 400 and electrically connected to the electronic chip 405 to form the electronic device 30. In this embodiment, the electronic panel 401 is a combination of a touch panel and a display module, which are provided with a sensing layer 4011 and a display module 4013, wherein the display module 4013 is laminated below the sensing layer 4011.

The electronic panel 401 can be an electronic panel in accordance with the foregoing embodiment or an altered electronic panel according to the instructions of the foregoing embodiments. Users can perform an interactive touch operation within the visible area VA according to the instructions displayed on the display module 4013. The sensing layer 4011 produces the corresponding touch signals to the electronic chip 405 according to users' touch operation. The electronic chip 405 controls the display module 4013 through the touch signals for displaying visual information such as scripts, patterns or images and the like.

However, it is to be noted that the embodiment of FIG. 5B does not limit the present disclosure. Either the sensing layer 4011 or the display module 4013 in the electronic panel 401 can be removed for forming a touch panel or display panel. In addition, the type and number of the electronic chips 405 are not for limiting the present disclosure.

In conclusion, the mask layers of the electronic panel in accordance with the present disclosure have at least an escape ditch. Therefore, bubbles produced during the process of laminating the sensing layer or the display module with the adhesive layer can be discharged from the escape ditch without lingering at the edge of the visible area, thereby improving the product's appearance and light transmittance.

The foregoing descriptions are the preferable embodiments of the present disclosure only, but are not limitations. Various modifications can be made thereto without departing from the spirit and scope of the disclosure. All modifications and substitutions to the claims of the present disclosure are defined by the attached claims.

What is claimed is:

1. An electronic panel comprising:
   a protection cover having a visible area and a non-visible area;
   a plurality of mask layers comprising:
      a first mask layer disposed on the non-visible area of the protection cover, and
      a second mask layer formed on the first mask layer, wherein the second mask layer has at least an escape ditch; and
      a third mask layer formed on the second mask layer, wherein the third mask layer has an escape ditch, and wherein an inner border of the third mask layer corresponding to an inner border of the first mask layer is normally recessed for a specific distance; and
   an adhesive layer formed on the plurality of mask layers within the non-visible area and on the protection cover within the visible area.

2. The electronic panel of claim 1, wherein the second mask layer has an inner edge and an outer edge, wherein the inner edge is adjacent to the visible area and the outer edge is adjacent to the edge of the protection cover, and wherein the escape ditch goes through the inner edge and the outer edge of the second mask layer.

3. The electronic panel of claim 1, wherein the escape ditch is located in a corner of the second mask layer.

4. The electronic panel of claim 1, wherein the escape ditch is located between two adjacent corners of the second mask layer.

5. The electronic panel of claim 4, wherein distance between two adjacent escape ditches is $\frac{1}{20}$ to $\frac{1}{10}$ of the side length of the protection cover and the width of the escape ditch is 0.1 mm to 0.2 mm.

6. The electronic panel of claim 1, wherein the electronic panel is a touch panel comprising a sensing layer laminated on the adhesive layer.

7. The electronic panel of claim 1, wherein the electronic panel is a display panel comprising a display module laminated on the adhesive layer.

8. A method of manufacturing an electronic panel, comprising the step of:
   providing a protection cover;
   forming a plurality of mask layers comprising forming a first mask layer on the protection cover, wherein the protection cover has a visible area and a non-visible area, and wherein the first mask layer is formed within the non-visible area;
   forming a second mask layer on the first mask layer, wherein the second mask layer has at least an escape ditch; and
   forming a third mask layer on the second mask layer, wherein the third mask layer has the escape ditch, and wherein an inner border of the third mask layer corresponding to an inner border of the first mask layer is normally recessed for a specific distance; and
   forming an adhesive layer on the first mask layer and the second mask layer within the non-visible area and on the protection cover within the visible area.

9. The method of manufacturing the electronic panel of claim 8, further comprising the step of: laminating a sensing layer on the adhesive layer to form a touch panel.

10. The method of manufacturing the electronic panel of claim 8, further comprising the step of: laminating a display module on the adhesive layer to form a display panel.

11. The method of manufacturing the electronic panel of claim 8, wherein the second mask layer has an inner edge and an outer edge, wherein the inner edge is adjacent to the visible area and the outer edge is adjacent to edge of the protection cover, and wherein the escape ditch goes through the inner edge and the outer edge of the second mask layer.

12. An electronic device, comprising:
   at least an electronic chip; and
   an electronic panel electrically connected to the electronic chip, wherein the electronic panel comprises:

a protection cover having a visible area and a non-visible area;

a plurality of mask layers comprising: a first mask layer disposed on the non-visible area of the protection cover, a second mask layer formed on the first mask layer, and a third mask layer formed on the second mask layer, wherein the second mask layer has at least an escape ditch, and wherein the third mask layer has the escape ditch, wherein an inner border of the third mask layer corresponding to an inner border of the first mask layer is normally recessed for a specific distance; and an adhesive layer formed on the plurality of mask layers within the non-visible area and on the protection cover within the visible area.

13. The electronic device of claim 12, wherein the second mask layer has an inner edge and an outer edge, wherein the inner edge is adjacent to the visible area and the outer edge is adjacent to edge of the protection cover, and wherein the escape ditch goes through the inner edge and the outer edge of the-second mask layer.

14. The electronic device of claim 12, wherein the escape ditch is located in a corner of the second mask layer.

15. The electronic device of claim 12, wherein the escape ditch is located between two adjacent corners of the second mask layer.

16. The electronic device of claim 12, wherein the electronic panel is a touch panel comprising: a sensing layer laminated on the adhesive layer.

17. The electronic device of claim 12, wherein the electronic panel is a display panel comprising: a display module laminated on the adhesive layer.

18. The electronic panel of claim 1, wherein an inner border of the second mask layer corresponding to an inner border of the first mask layer is normally recessed for a specific distance.

19. The method of manufacturing the electronic panel of claim 8, wherein an inner border of the second mask layer corresponding to an inner border of the first mask layer is normally recessed for a specific distance.

20. The electronic device of claim 12, wherein an inner border of the second mask layer corresponding to an inner border of the first mask layer is normally recessed for a specific distance.

* * * * *